United States Patent [19]

Wener

[11] E Re. 29,841

[45] Reissued Nov. 21, 1978

[54] SAFETY VEHICLE SEAT STRUCTURE

[75] Inventor: Hyman Wener, Laval, Canada

[73] Assignee: Dorel Co. Ltd., Montreal North, Canada

[21] Appl. No.: 739,148

[22] Filed: Nov. 5, 1976

Related U.S. Patent Documents

Reissue of:

[64] Patent No.: 3,922,035
Issued: Nov. 25, 1975
Appl. No.: 496,054
Filed: Aug. 9, 1974

[51] Int. Cl.[2] ..... A47D 1/10

[52] U.S. Cl. ..... 297/250; 297/253; 297/329

[58] Field of Search ..... 297/250, 253, 329

[56] References Cited

U.S. PATENT DOCUMENTS

| | | | |
|---|---|---|---|
| 2,954,594 | 10/1960 | Finken | 24/170 |
| 3,325,213 | 6/1967 | Levy | 297/250 X |
| 3,510,151 | 5/1970 | Weman | 24/170 |
| 3,512,830 | 5/1970 | Norman | 297/385 X |
| 3,550,957 | 12/1970 | Radke | 297/386 |
| 3,606,453 | 9/1971 | Cicero | 297/254 |
| 3,669,492 | 6/1972 | Peterson | 297/253 |
| 3,709,558 | 1/1973 | Jakob | 297/250 |
| 3,760,861 | 10/1973 | Goldberg | 297/253 |
| 3,767,259 | 10/1973 | Blake | 297/250 |
| 3,791,694 | 2/1974 | Roberts | 297/250 |

*Primary Examiner*—Francis K. Zugel

[57] ABSTRACT

A safety vehicle seat structure comprising a seat having a backrest and a seat portion. A support frame is secured to the seat and comprises a pair of spaced-apart vertical back support members each pivotally secured at their upper ends to a respective side of the backrest. Each vertical back support member has a lower end secured to a respective one of two horizontal supports located below the seat portion. At least one connecting member is secured to the seat portion forwardly of the back support members and extends therebelow to pivotally interconnect with a displaceable lever framework whereby actuation of the lever framework will cause displacement of the seat between two positions relative to the support frame. A belt attachment clamp is secured to the horizontal support members and adapted to receive and rigidly engage a portion of a retaining belt extending therethrough. A safety strap structure is also provided for immovably securing the seat and support frame to a rigid external structure and further provides shock absorbing means for damping the forward movement of a person's body when subjected to a shock.

12 Claims, 8 Drawing Figures

SAFETY VEHICLE SEAT STRUCTURE

Matter enclosed in heavy brackets [ ] appears in the original patent but forms no part of this reissue specification; matter printed in italics indicates the additions made by reissue.

BACKGROUND OF INVENTION a. Field of the Invention

The present invention relates to a seat structure and more particularly to a safety vehicle seat structure for children and of the type normally utilized for attachment to an automobile seat.

b. Description of Prior Art

Various types of automobile seats for children are known. The majority of these seats are normally attached to the backrest of an automobile seat or else provided with a framework which is adapted to be wedged in the gap between the backrest and seat portion of an automobile seat. Further, it is known to attach the framework of such seats to the retaining safety belt which is normally provided on the seat of an automobile for engagement across the waist or laps of a person sitting on the automobile seat.

All of the structures heretofore known do not, however, provide a seat which is rigidly attached to the framework of the vehicle whilst, at the same time, providing ample security to the child sitting in the seat.

SUMMARY OF INVENTION

It is, therefore, a feature of the present invention to provide an improved safety vehicle seat structure which can be immovably secured to an automobile framework whilst positioned on the automobile seat and providing safe retention of a child sitting in the seat.

It is a further feature of the present invention to provide a safety automobile seat structure which is supported on a framework which is lockable in two positions whereby to cause displacement of the seat to assume two positions.

It is a still further feature of the present invention to provide a safety vehicle seat structure having a belt attachment clamp secured to the support frame and adapted to receive and rigidly engage a retaining belt extending therethrough and secured to the vehicle frame structure.

A still further feature of the present invention is to provide a safety vehicle seat structure incorporating a safety strap structure for immovably securing the seat and the support frame to a rigid vehicle structure, the safety strap structure further providing shock absorbing retention of a child sitting in the seat.

According to the above features, from a broad aspect, the present invention provides a safety vehicle seat structure comprising a seat having a backrest and a seat portion. A support frame is secured to the seat and comprises a pair of spaced-apart vertical back support members each pivotally secured at their upper ends to a respective side of the backrest. Each vertical back support member has a lower end secured to a respective one of two horizontal supports located below the seat portion. At least one connecting member is secured to the seat portion forwardly of the back support members and extends therebelow to pivotally interconnect with a displaceable lever framework whereby actuation of the lever framework will cause displacement of the seat between two positions relative to the support frame.

According to a further broad aspect, the present invention provides a safety seat structure comprising a seat having a backrest and a seat portion. A rigid support frame is secured to the seat and supports the seat above lower horizontal support members. A belt attachment clamp is secured to the horizontal support members and adapted to receive and rigidly engage a belt positioned therethrough and secured to a vehicle frame.

From a still further broad aspect, the present invention provides a seat structure comprising a seat having a backrest and a seat portion. A support frame is provided for maintaining the seat elevated from a horizontal plane. A safety strap structure is provided for immovably securing the seat and support frame to a rigid external structure, the safety strap structure further providing shock absorbing retention of a child sitting in the seat.

BRIEF DESCRIPTION OF DRAWINGS

A preferred embodiment of the present invention will now be described with reference to the accompanying drawings in which.

DESCRIPTION OF PREFERRED EMBODIMENTS

Figures 1, 2:
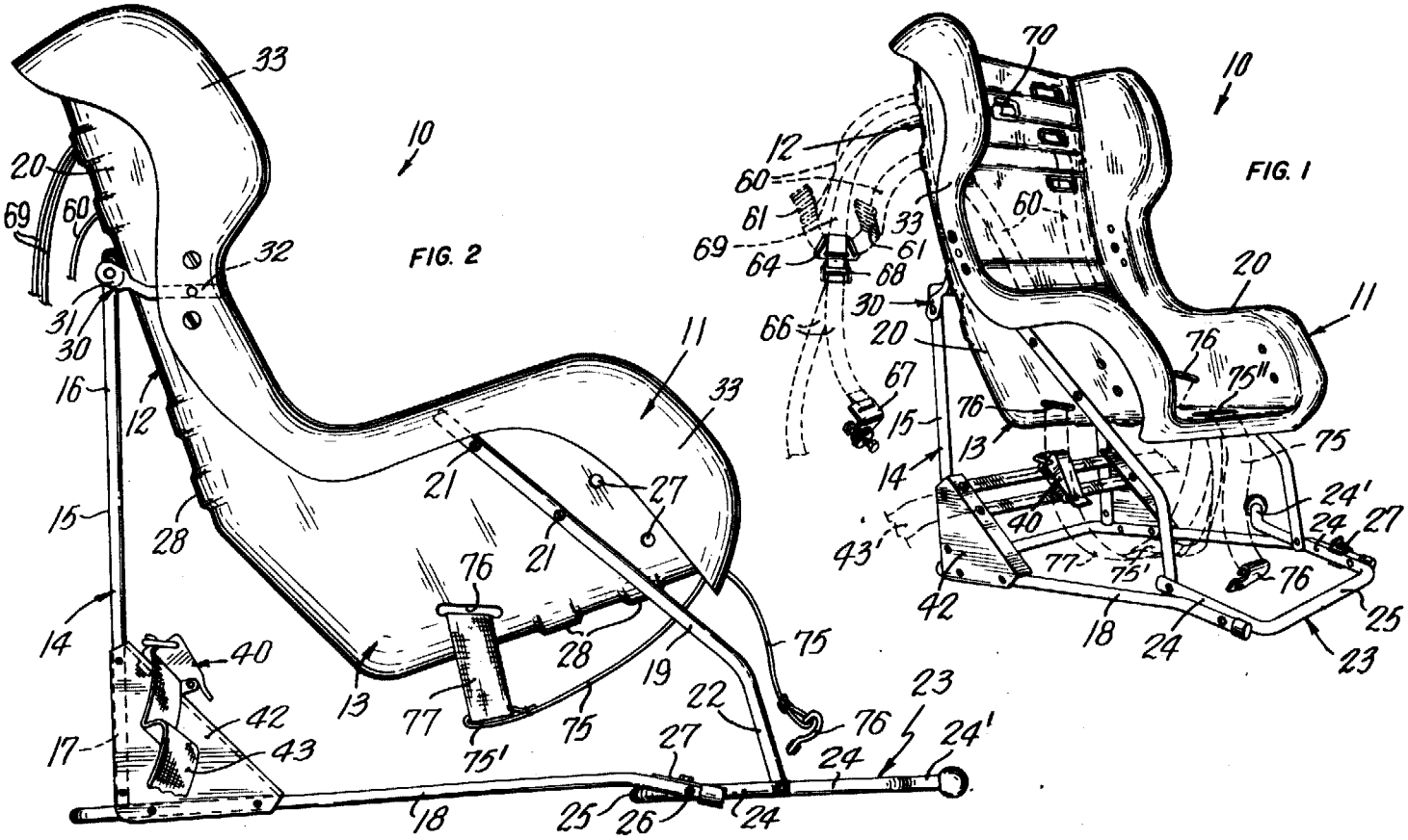
FIG. 1 is a perspective view of the safety seat structure of the present invention.
FIG. 2 is a side view of the safety seat structure shown in FIG. 1, but with the seat secured in a second position with the support frame.

Referring now to the drawings, and more particularly to FIGS. 1 to 4, there is shown, generally at 10, the safety vehicle seat structure. The seat structure 10 comprises a seat 11 having a backrest 12 and a seat portion 13. A support frame 14 is secured to the seat 11 and comprises a pair of spaced-apart vertical back support members 15 each pivotally attached at their upper ends 16 to a respective side of the backrest 12. Each of the vertical back support members 15 have a lower end 17 secured to a respective one of two horizontal support members 18 located below the seat portion 13. At least one connecting member 19 is secured to a protective side wall 20 of the seat portion 13 by suitable means such as rivets, screws or bolts 21. The connecting member 19 extends downwardly and forwardly of the seat portion 13 to pivotally interconnect at its lower end 22 with an actuable lever framework 23.

The actuable lever framework consists of a generally U-shaped frame having two parallel end members 24 and an integrally formed interconnecting transverse member 25. As shown more clearly in FIG. 2, the lower end 22 of the connecting member 19 is pivotally secured to the free end of one of the end members 23. The end members 23 are each pivotally secured at 26 and adjacent their interconnected end to a respective one of the horizontal supports 18. A locking clamp 27 is secured to one of the horizontal supports 18 and adapted to engage an associated one of the end members 24 when in either one of the two positions as illustrated respectively by FIGS. 1 and 2.

As shown in FIG. 1, when the end members 24 are positioned rearwardly under the seat portion 13 of the seat 11, the seat 11 is in a vertical position. By disengaging the locking clamp 27 and retracting the end members 24 forwardly to a position as shown in FIG. 2, the seat 11 is in an inclined or rest position. One of the end members 24 may be extended to constitute a lever arm 24'.

Figure 3:
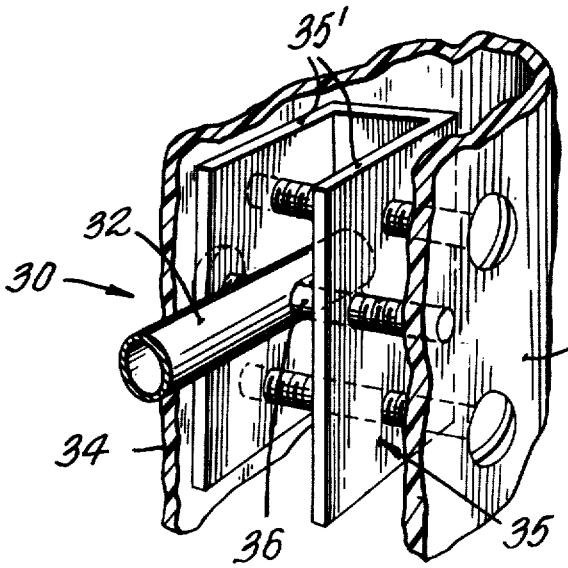
FIG. 3 is a fragmented perspective view of a portion of the seat side wall showing a pivotable link attachment.

Referring more particularly to FIGS. 1 to 3, there is shown that the upper end 16 of the vertical support members 15 are pivotally attached to a respective side wall 20 of the backrest 12 of the seat through a pivoting link 30 pivotally secured at one end 31 to an associated vertical support member 15 and pivotally secured at its other end 32 to the protective side wall 20 of the backrest 12. As can be seen, the protective side wall 20 is forwardly projecting from the backrest and seat portion whereby to provide protection of a child sitting in the seat. The side wall 20 has a portion thereof 33 which is of substantially channel cross section defining two spaced-apart walls 34, see FIG. 3. The link 30 is pivotally secured in a channel bracket 35 which is secured between the spaced-apart walls 34 whereby to provide a rigid pivotal connection at the end 32 of the link 30 with the set 11. The channel bracket 35 is secured by suitable means such as bolts or rivets extending through the two walls 34 and the side wall 35' of the bracket 35. A hinge pin 36 extends through the bracket 35 and the link 30 whereby to provide the pivotal connection.

As shown in FIGS. 1 and 2, the set 11 is formed as an integrally molded part made of moldable material such as plastic material or other suitable material. Also, as shown in FIG. 1, the side wall 20 of the seat adjacent the seat portion 13 may be provided with one or more pairs of holes 27 whereby to provide alternate connections of the connecting member 19 to position the seat at other angles relative to the support frame 14. Further, the connecting member 19 may be secured to the seat at another position, for example, under the seat or there may be provided two such connecting members 19 on each side of the seat 11. Still further, the actuable lever framework 23 may be constructed differently with the lever arm 24' formed with the end member 24 to which the connecting member is pivotally secured. The locking clamp 27 would also be provided on the same side of the support frame 14 as the end member 24 to which the locking clamp is secured. Furthermore, the seat may be molded with reinforcing ribs 28 formed integrally therewith and extending transversely across the seat portion 13 and the backrest 12.

Figure 4:
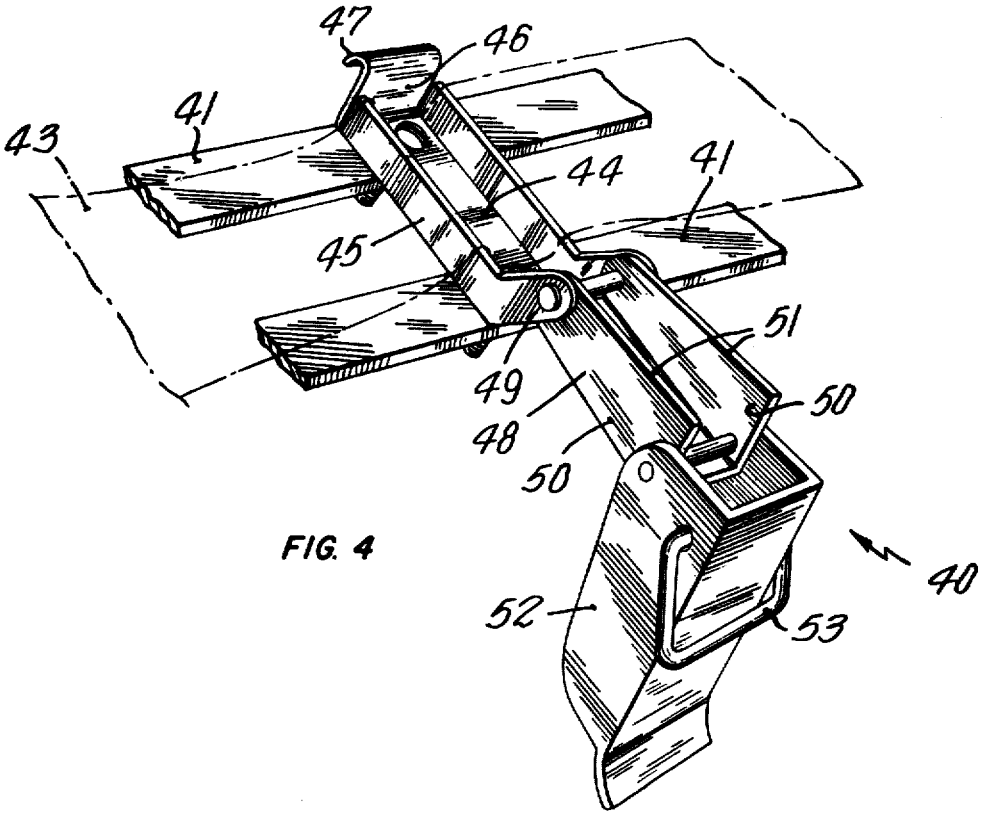
FIG. 4 is a perspective view of the belt attachment clamp.

Referring now to FIGS. 1, 2 and 4, there is shown the construction of a belt attachment clamp 40 secured between the horizontal support members 18 and more particularly, to cross members 41 bridging the horizontal support members 18 and secured to a corner angle bracket 42 interconnecting each vertical back support member 15 to its respective horizontal support member 18 to provide a rigid support frame. The belt attachment clamp 40 is secured substantially centrally between the horizontal support members 18 although other convenient locations for such clamp may be provided as long as it fulfills its intended purpose, that being to clamp a retaining belt 43 to the support frame 14. The belt 43 is normally provided with the seats of automobiles, and adapted to extend over the waist or laps of a person sitting on the automobile seat.

Referring now more particularly to FIG. 4, there is shown in detail the construction of the belt attachment clamp 40. The clamp 40 comprises a base channel member 44 having two parallel side walls 45 and a hook member 46 protruding at one end of the base channel 44 and extending above the parallel side walls 45 and terminating into an outwardly curved or hook end 47. A belt wedge element 48 is pivotally secured at one of its ends to the other end of the base channel 44 between end projections 49 of the side walls 45. The wedge element 48 is comprised of two parallel walls 50, substantially triangular in surface area, and defining belt clamping lower edges 51 adapted to be positioned in the channel member 44 between the side walls 45. A clamp lever plate 52 is pivotally secured to the free end of the wedge element 48, adjacent the opposite edge to the belt clamping edges 51. The clamp lever plate 52 is provided with an attaching loop 53 which is pivotally retained in the plate 52 and adapted to engage with the hook end 47 of the hook member 46 whereby to rigidly retain the wedge element 48 in the base channel 44 with the clamp lever thereover, as shown in FIG. 1.

As shown in FIG. 1, with the attaching loop 53 engaging with the hook member 46 and the lever plate 52 clamped downwardly over the channel member 44, a very tight connecton is provided between the lever plate 52 and the hook member 47 as the attaching loop 53 is slightly inset, thus applying tension on the hook member 47 to rigidly secure a porton of a retaining belt 43, positioned across the two parallel side walls 45 of the base channel 44, under the wedge element 48. Thus, the support frame 14 may be rigidly attached to a vehicle seat and the vehicle framework by means of the retaining safety belts 43 which are commonly provided with such vehicles.

Referring now to FIGS. 1 and 5 to 7, there is shown a safety strap structure for immovably securing the seat 11 and support frame 14 to a rigid external structure (not shown). The safety strap structure further provides shock absorbing retention of the person sitting in the seat 11 upon forward movement of that person relative to the seat and when exerting a predetermined pressure against certain ones of the straps of the structure. As shown more clearly in FIG. 5, the safety strap structure comprises two shoulder straps 60 constructed of rigid strapping material such as utilized for safety belts normally provided in automobiles. The shoulder straps 60 are provided with shock absorbing expandable means 61 constituted by a section of each shoulder strap 60 being folded in abutment and aligned relationship with each other and secured along this section by a plurality of spaced-apart transverse rows of stitches 62. Upon application of a predetermined force along the shoulder straps 60, between the shock absorbing section 61, the rows of stitches will break in sequential order, in the direction from row 62' to row 62", thus permitting the person in the seat to move gradually forward to absorb the shock to which it is subjected at the time of impact of the vehicle.

Figure 5:
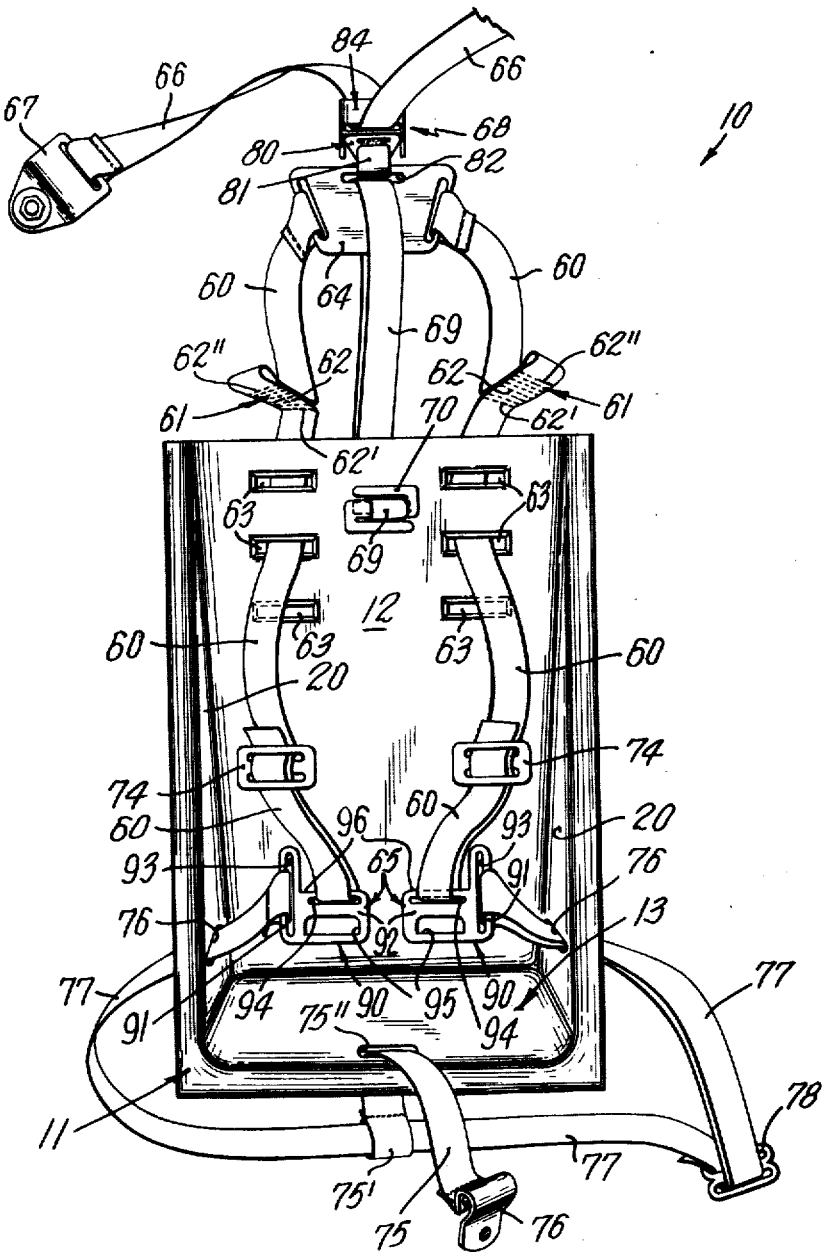
FIG. 5 is a schematic front view of the seat illustrating the safety strap structure.

The shoulder straps 60 are guided over a respective shoulder of the person sitting in the seat by means of guide apertures 63 provided on each side in the upper part of the backrest 12. As shown in FIG. 5, there may be provided a plurality of aligned pairs of apertures 63 whereby to accommodate children of varying sizes.

Normally, this type seat is utilized for seating young children and thus the spacing between the rows of guide apertures is determined by the size range of such children. Further, the shock absorbing sections 61 are preferably, although not exclusively, provided in the portion of the shoulder straps 60 extending rearwardly of the backrest 12 whereby not to interfere with the person sitting in the seat.

As shown in FIG. 5, each end of the shoulder straps 60 are attached to a strap connector 64 and 65, respectively. The upper end of the straps 60 are permanently secured to connector 64. An adjustable attachment strap 66 is also connected to connector 64 and has an attachment clamp 67 at one end thereof for securement to the framework of a vehicle, whilst the other end of the strap 66 is secured to the connector 64 by a hook plate member 68 providing rigid retention of the strap 66 between the attachment clamp 67 and the connector 64. The strap connector 64 is further attached to the backrest 12 of the seat 11 by an adjustable seat attachment strap 69 secured between the strap connector 64 and the backrest 12. A portion of the free end of the attachment strap 69 is passed through an aperture (not shown) located substantially centrally between a pair of apertures 63 in the upper end of the backrest 12 and is engaged with the backrest by an S-shaped bracket 70 which positively engages the strap 66 and prevents it from being pulled back through the aperture. Thus, the seat 11 is rigidly anchored to the vehicle structure via the strap 69, the connector 64, the strap 66 and the attachment clamp 67.

Figure 6:
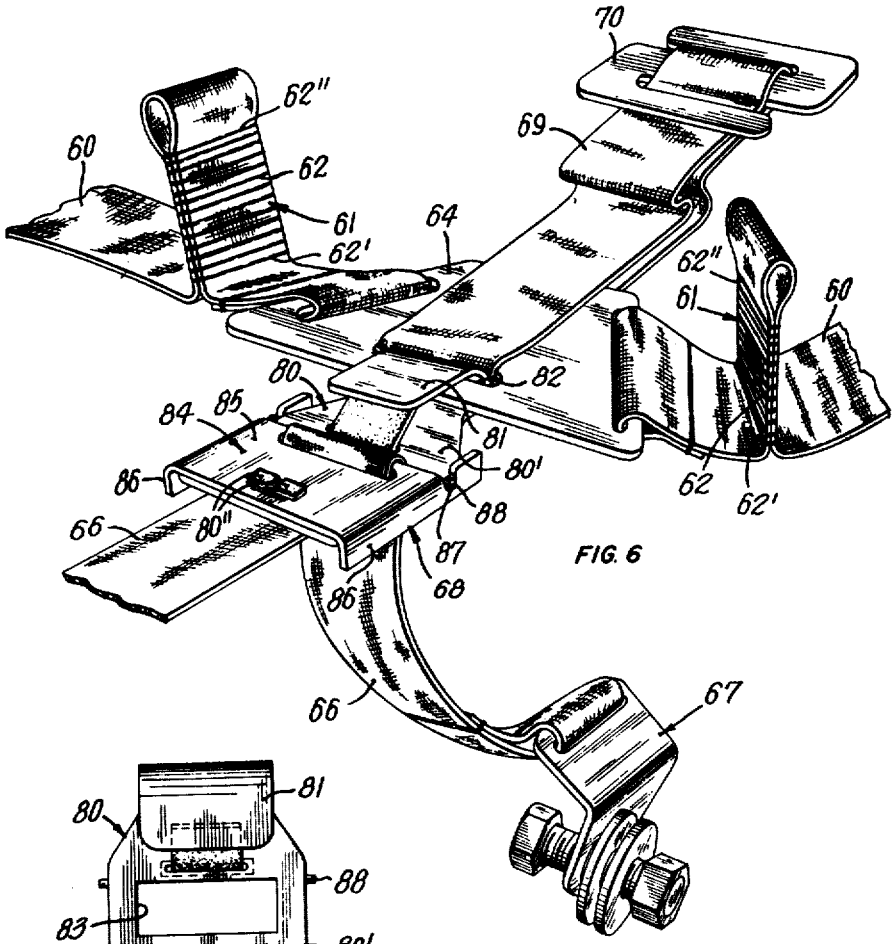
FIG. 6 is a perspective view of a portion of the safety strap structure.
Figure 7A:
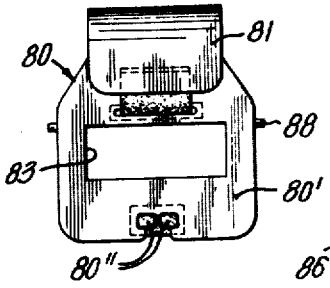
FIGS. 7A and 7B are plan views of the parts of the hook plate member.
Figure 7B:
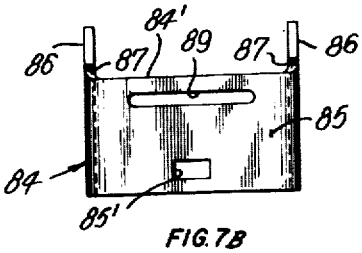

Referring now to FIGS. 6 and 7a and 7b, there is shown the construction of the metal hook plate member 68. The plate member 68 has a hook plate 80 having flat wall portion 80' and a hook flange 81 at one end thereof securable within a slot 82 provided in the strap connector 64. An aperture 83 is provided through the plate 80 for receiving the strap 66 therethrough. A cover plate 84 having a top wall 85 and transverse side walls 86 is secured in juxtaposition with the flat wall 80'. A vertical groove 87 is provided in the forward portion of each side wall 86 and receives and engages with a pin projection 88, formed in the sides of the wall portion 80', whereby the cover plate 84 and hook plate 80 may secure a portion of the strap 66 associated therewith. A retention member 80'' also passes through and resiliently engages with the end walls of a retention aperture 85' provided in the top wall 85 of the plate 84 to retain the plate 84 over the plate 80. A slot 89 is further provided adjacent an edge of the top wall 85 of plate 84 for registry with a portion of the aperture 83 whereby the securing strap 66 may be clamped to the hook plate 80 by passing the strap 66 below the hook plate 80, through the aperture 83 and then over the leading edge 84' of the cover plate 84 into the slot 89 and then back through the aperture 83. The attachment clamp 67 at the securing end of the strap 66 is fastened rearwardly of the hook plate member 68 with both portions of the strap 66 in juxtaposition under the plate 80. Thus, the strap 66 will be positively clamped at its portion extending through the aperture 83 and slot 89 and between the slot 89 and the rear edge 83' of the aperture 83.

Referring now to FIG. 5, it is seen that the lower end of the shoulder straps 60 is secured to a further strap connector 65, as above-mentioned. The connector 65 is formed of metal and consists of two identical L-shaped connector plates 90 having a vertical arm 91 and a transverse horizontal arm 92 formed integrally therewith and extending from an end of the arm 91. A belt receiving slot 93 is formed longitudinally in the arm 91. A further belt receiving slot 94 is also formed longitudinally adjacent the upper edge 96 of the arm 92. A further slot 95 is provided in the arm 92 below the slot 94. As shown, the lower end of each shoulder strap 60 is adjustably secured in the slot 94 of a respective one of the L-shaped connector plates. The adjustable buckles 74 provide adjustment of the length of the shoulder straps 60 and retention in the slots 94.

A further adjustable belt 77 extends from one of the slots 93 and permanently secured thereto. The free end of the belt 77 extends through a respective one of two aligned slots 76 each provided in a respective side wall 20 of the seat 11 adjacent the seat portion 13 and passes under the seat 13 through the other slot 76, into the slot 93 of the other connector plate 90, and back through the said other slot 76. The free end of the belt 77 is then adjustably secured to the portion of itself by means of an adjustable buckle 78. A further strap 75 is looped at one end 75' about the strap 77 under the seat 11 and passes through a slot 76'' centrally located adjacent the front edge of the seat 13. A securing tab 76 is provided at the other end of the strap 75. The tab 76 secured the connector plates 90 together by juxtaposing both slots 95 with each arm 91 positioned outwardly, as shown in FIG. 5. The tab is passed through both aligned slots 95 and secured. Thus, a person sitting in the seat is rigidly held therein by means of shoudler straps 60 extending substantially downwardly in a V-configuration down to the connector 65. A waist or lap belt 77 then extends across the lap or waist of the person and securing strap 75 extends between the legs of the person. Thus, the lower part of the person's body is rigidly held and it can be seen that, on impact, the upper part of the body of the person will move slightly forward applying tension along the shoulder straps 60 causing the rows of stitches 62 in the shock absorbing section 61 to break and thus providing releasable retention of the person's upper body portion whereby to dampen the shock on impact.

The assembly and operation of the safety seat structure as hereinabove described will now be explained. The seat support frame 14 is rigidly held in the desired position by operating the lever framework 23 as previously described. The support frame is then positioned on an automobile seat and secured to the seat by the safety retaining belt 43 which is normally provided for engagement across the lap of a person sitting in the automobile seat. This strap 43 is engaged by the belt attachment clamp 40 as previously described. Thus, the bottom rearward portion of the support frame 14 is rigidly retained on the seat and to the vehicle structure as the belt 43 is attached thereto. The upper portion of the backrest 12 of the seat 11 is then secured to a convenient part of the vehicle structure. If the seat 11 is to be secured on the back seat of an automobile, the attachment clamp 67 at the end of the strap 66 is secured to the framework rearwardly of the backrest of the automobile seat below the rear windshield.

The connector plates 90 of connector 65 are disconnected to permit the person to be seated in the seat 11. The shoulder straps 60 and the further adjustable belt 77 are then secured tautly by their respective adjustable buckles whereby the person is comfortably seated and held in the seat 11. If the automobile to which the seat 11 is secured is involved in an accident sufficient to cause an impact, the seat 11 will not move forwardly on impact as it is secured to the vehicle framework. However, the person sitting in the seat will be subjected to a forward momentum caused by this impact and will apply a tension along the longitudinal axis of the shoulder straps 60. If this tension exceeds a predetermined force, it will cause the rows of stitches 62 in the shock absorbing extension 61 to break in a sequential order, from stitches 62' to stitches 62'', causing the forward movement of the person's body to be arrested gradually within a predetermined displacement range whereby to provide shock absorbing retention of the body.

I claim:

1. A safety vehicle seat structure comprising a seat having a backrest and a seat portion, a support frame secured to said seat, said support frame comprising a pair of spaced apart vertical back support members each pivotally secured at their upper ends *to an end of a respective pivoting link, the other end of said pivoting link being pivotally secured* to a respective side of said backrest, each said vertical back support members having a lower end secured to a respective one of two horizontal support members located below said seat portion, at least one connecting member secured to said seat portion forwardly of said back support members and extending therebelow to pivotally interconnect with a displaceable lever framework whereby actuation of said lever framework will cause displacement of said seat between two positions relative to said support frame, said displaceable lever framework including a frame having opposed parallel arms and an interconnecting arm connected between said opposed arms, each said opposed parallel arms being pivotally interconnected near said interconnecting arm to a respective one of said two horizontal support members below said seat portion, one of said opposed arms being pivotally interconnected at its free end with said at least one connecting member, one of said opposed arms being lockable with one of said horizontal support members.

2. A safety vehicle seat as claimed in claim 1 wherein one of said opposed arms is provided with a lever arm for actuation of said displaceable framework.

3. A safety vehicle seat as claimed in claim 2 wherein said lever arm is releasably locked with one of said horizontal support members whereby to rigidly secure said support frame in two different configurations to support said seat in two different positions.

4. A safety vehicle seat structure as claimed in claim 1 wherein a belt attachment clamp is secured to said support frame below said seat portion and adapted to receive and rigidly engage a portion of a retaining belt extending therethrough and secured to a vehicle frame.

5. A safety vehicle seat structure as claimed in claim 4 wherein said belt attachment clamp comprises a base channel member having two parallel side walls, a hook member at one end of said base channel and having a hook end, a wedge element pivotally secured at one end to the other end of said base channel member between sid two parallel side walls, the other end of said wedge element being pivotally connected to a clamp lever plate having an attaching loop adapted to engage with said hook end and rigidly secure said wedge element in said base channel with said lever plate thereover whereby to rigidly secure a portion of a belt positioned acros said two parallel side walls of said base channel and under said wedge element.

6. A safety vehicle seat structure as claimed in claim 1 further comprising a safety strap structure for immovably securing said seat and support frame to a rigid external structure, said safety strap structure having shock absorbing means for damping the forward movement of a person's body when subjected to a shock.

7. A safety vehicle seat structure as claimed in claim 6 wherein said safety strap structure comprises two shoulder straps each having said shock absorbing means therein, said shoulder straps being guided over a respective shoulder of a person sitting in said seat and extending frontwardly downward of said person, said two shoulder straps each being rigidly secured at one end to said rigid external structure, and at its other end to a further strap extending about said seat portion.

8. A safety vehicle seat structure as claimed in claim 7 wherein said shock absorbing expandable means comprises a section of said shoulder strap being folded in abutment and aligned relationship to define two abuting strap sections, said two sections being secured to each other by a plurality of spaced apart transverse rows of stitches whereby a predetermined force applied along the longitudinal axis of said shoulder strap will cause said rows of stitches to break in sequential order as said section of strap detaches itself.

9. A safety vehicle seat structure as claimed in claim 7 wherein guide apertures are provided in an upper part of said backrest for receiving a respective shoulder strap therethrough, said expandable means being located behind said backrest between a shoulder strap upper end and an associated guide aperture, each said shoulder strap upper end being attached to a strap connector, an adjustable seat attachment strap secured between said strap connector and said backrest, and an adjustable securing strap having a connector at one end secured to said rigid external structure, the outer end of said securing strap being adjustably connected to said strap connector.

10. A safety vehicle seat structure as claimed in claim 9 wherein said securing strap is connected to said strap connector by a hook plate member having a hook plate with a flat wall portion and a hook flange at one end thereof securable to said strap connector, an aperture through said flat wall portion, a cover plate retained in juxtaposition with said flat wall portion, a strap receiving slot in said cover plate in registry with said aperture in said flat wall, means for retaining said cover plate over said flat wall portion of said hook plate, said securing strap having a portion thereof secured to said strap connector by passing said strap below said flat wall portion of said hook plate through said aperture and over a leading edge of said cover plate and through said slot and aperture whereby said strap is in juxtaposition beneath said hook plate and extends rearwardly thereof from said secured position.

11. A safety vehicle seat structure as claimed in claim 7 wherein both said shoulder straps are each secured at a lower end thereof above said seat portion to a respective connector plate of a further strap connector, a further adjustable belt extending transversely through vertical side walls of said seat and spaced above said seat, said further adjustable strap being secured to both said connector plates to form a loop passing above and below said seat, and a further strap secured at one end to aligned slots in juxtaposed positions of said connector plates and at another end to said further adjustable strap under said seat portion.

12. A safety vehicle seat structure comprising a seat having a backrest and a seat portion, a support frame secured to said seat, said support frame comprising a pair of spaced apart vertical back support members each pivotally secured at their upper ends to a respective side of said backrest, each said vertical back support members having a lower end secured to a respective one of two horizontal support members located below said seat portion, at least one connecting member secured to said seat portion forwardly of said back support members and extending therebelow to pivotally interconnect with a displaceable lever framework whereby actuation of said lever framework will cause displacement of said seat between two positions relative to said support frame, said upper end of each said vertical support members being pivotally interconnected to a respective side of said backrest through a pivoting link pivotally secured at one end to said vertical support member upper end and pivotally secured at its other end to a protective side wall of said backrest, said seat side wall being forwardly projecting and of channel cross-section defining two spaced apart walls, said link being pivotally secured in a channel bracket secured between said spaced apart walls to a rigid pivotal connection in said channel bracket.

* * * * *